Patented Feb. 26, 1946

2,395,386

UNITED STATES PATENT OFFICE 2,395,386

PHENYL SULPHONYL ESTERS OF NITRO ALCOHOLS

Philip J. Baker, Jr., Terre Haute, Ind., assignor to Commercial Solvents Corporation, Terre Haute, Ind., a corporation of Maryland No Drawing. Application February 4, 1944, Serial No. 521,125

4 Claims. (Cl. 260—456)

The present invention relates to new chemical compounds. More particularly, it relates to phenyl sulphonyl esters of nitro alcohols and to a process for the preparation thereof. The new chemical compounds of my invention may be represented by the following general structural formula:

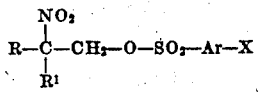

wherein X represents a substituent selected from the group consisting of hydrogen, alkyl and acylamino, R represents a substituent of the group consisting of hydrogen and alkyl, Ar represents a phenyl nucleus, while R¹ represents an alkyl substituent.

As examples of compounds included by the above generic formula, as well as di- and tri-esters forming the subject matter of copending divisional applications, Serial No. 604,082, and Serial No. 604,083 there may be mentioned 2-nitroisobutyl p-toluenesulphonate, 2-nitrobutyl p-toluenesulphonate, 2-nitro-2-methyltrimethylene p-toluenesulphonate, tris-(p-toluenesulphonoxymethyl) nitromethane, 2-nitroisobutyl benzenesulphonate, 2-nitro-2-methyltrimethylene benzenesulphonate, 2-nitro-2-ethyltrimethylene benzenesulphonate, tris(benzenesulphonoxymethyl)-nitromethane, 2-nitroisobutyl p-acetamidobenzenesulphonate, 2-nitro-2-methyltrimethylene p-acetamidobenzenesulphonate, tris(p-acetamidobenzenesulphonoxymethyl) nitromethane, and the like.

In accordance with my invention, compounds of the above type are prepared by first mixing a nitro alcohol with a phenyl sulphonyl halide and thereafter slowly adding to this mixture a suitable base, such as, for example, a tertiary amine. The nitro alcohol and phenyl sulphonyl halide are preferably reacted with one another in approximately equivalent quantities while the tertiary amine is generally preferably employed in a quantity slightly in excess of the equivalent amount. The initial reaction is rather vigorous and precautions should therefore be taken in order to avoid decomposition of the reactants. After the initial stage of the reaction has been completed, however, the reaction mixture is preferably heated to a temperature of between about 80° and 100° C. so that the reaction is driven as nearly to completion as possible. The resultant mixture is then cooled, and water is added in order to remove the hydrogen halide of the tertiary amine and any unreacted alcohol which might be present. At this stage of the procedure, the ester will generally be observed to solidify. The product is then filtered and washed with water. In most cases the esters can be crystallized either from methanol or ethanol. Frequently benzene or similar hydrocarbons can be used for this purpose.

The nitro alcohols utilized in preparing the new phenyl sulphonyl esters of my invention as well as di- and tri-esters forming the subject matter of copending divisional applications, Serial No. 604,082, and Serial No. 604,083 may be any of a large number of compounds such as, for example, 2-nitro-1-ethanol, 2-nitro-1-propanol, 2-nitro-2-methyl-1-propanol, 2-nitro-1-butanol, 2-nitro-2-methyl-1,3-propanediol, 2-nitro-2-ethyl-1,3-propanediol, tris(hydroxymethyl)nitromethane, and the like.

As examples of tertiary amines which may be utilized in synthesizing the compounds of my invention, there may be mentioned pyridine, trimethylamine, tributylamine, quinoline, and the like. Bases such as sodium carbonate and sodium hydroxide may also be employed in place of tertiary amines; however, it has been my general observation that the results obtained when using such bases are less satisfactory. Solvents, such as benzene, chloroform, and xylene, may be employed. However, it has usually been found that the yield of the desired phenyl sulphonyl ester is lower when a solvent is utilized.

My invention may be further illustrated by the example which follows. Since the reaction involved is very general in character, it is considered necessary to set forth only a single example of the procedure employed for preparing the phenyl sulphonyl esters of my invention.

EXAMPLE

A mixture consisting of 6 parts of 2-nitro-2-methyl-1-propanol and 9.5 parts of p-toluenesulphonyl chloride was placed in a suitable reaction vessel, after which was slowly added thereto, with agitation, 5 parts of pyridine. When all of the pyridine had been added, the reaction mixture was placed on a steam bath for a period of approximately 1 hour, and thereafter cooled to room temperature. Twenty parts of water was next added, with stirring. As a result, the crude 2-nitroisobutyl p-toluenesulphonate precipitated. The precipitate was then filtered and washed with two 20-part portions of water. This washed material was then crystallized from methanol. The crystalline 2-nitroisobutyl p-toluenesulphonate thus obtained melted at 72°-73° C. and amounted to a yield of 76.7%.

Analysis: Calculated for per cent N, 5.13; per cent S, 11.72. Found: Per cent N, 5.38; per cent S, 12.28.

In the table which follows, there appears a list of typical compounds prepared in accordance with the procedure outlined above.

Table I

| Compound | M. P., °C. | Analyses | | | |
|---|---|---|---|---|---|
| | | Found | | Calc'd. | |
| | | Per-cent N | Per-cent S | Per-cent N | Per-cent S |
| 2-nitrobutyl p-toluenesulphonate | 52.5-53 | 5.18 | 12.11 | 5.13 | 11.72 |
| 2-nitro-2-methyltrimethylene p-toluenesulphonate | 98.5-99 | 3.61 | 14.46 | 3.15 | 14.43 |
| 2-nitro-2-ethyltrimethylene p-toluenesulphonate | 153-154 | 3.53 | 14.42 | 3.04 | 13.99 |
| Tris (p-toluenesulphonoxymethyl) nitromethane | 122-123 | 2.32 | 15.40 | 2.28 | 15.66 |
| 2-nitroisobutyl benzenesulphonate | 56 | 5.47 | 12.63 | 5.44 | 12.34 |
| 2-nitro-2-methyltrimethylene benzenesulphonate | 114 | 3.64 | 15.60 | 3.35 | 15.40 |
| 2-nitro-2-ethyltrimethylene benzenesulphonate | 69-69.5 | 3.53 | 15.50 | 3.26 | 14.90 |
| Tris (benzenesulphonoxymethyl) nitromethane | 122-123 | 2.88 | 17.9 | 2.45 | 16.8 |
| 2-nitroisobutyl p-acetamidobenzenesulphonate | 153-154 | 9.21 | 11.2 | 8.86 | 10.1 |
| 2-nitro-2-methyltrimethylene p-acetamidobenzenesulphonate | 198 | 8.10 | 12.7 | 7.93 | 12.1 |

Although the above physical properties may be helpful in identifying these compounds, it is to be understood that I do not desire to limit myself to products having the exact physical constants described above, since the data were obtained from a single preparation of the various compounds listed.

The phenyl sulphonyl esters of my invention are useful for numerous purposes, particularly as plasticizers for synthetic ruber and similar type polymers. Other uses of these products will readily occur to those skilled in the art.

My invention now having been described, what I claim is:

1. Phenyl sulphonyl esters of nitro alcohols having the formula:

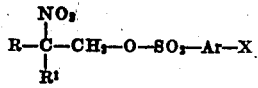

wherein X represents a substituent selected from the group consisting of hydrogen, alkyl and acyl-amino, R represents a substituent of the group consisting of hydrogen and alkyl, Ar represents a phenyl nucleus, while $R^1$ represents an alkyl substituent.

2. 2-nitrobutyl p-toluenesulphonate.
3. 2-nitroisobutyl benzenesulphonate.
4. 2-nitroisobutyl p-toluenesulphonate.

PHILIP J. BAKER, Jr.